(12) United States Patent
Buck et al.

(10) Patent No.: US 7,014,028 B2
(45) Date of Patent: Mar. 21, 2006

(54) DRIVE DEVICE

(75) Inventors: Gerhard Buck, Friedrichshafen (DE); Helmut Eymüller, Friedrichshafen (DE); Siegfried Stützle, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 37 days.

(21) Appl. No.: 10/485,501

(22) PCT Filed: Aug. 30, 2002

(86) PCT No.: PCT/EP02/09710

§ 371 (c)(1),
(2), (4) Date: Jan. 30, 2004

(87) PCT Pub. No.: WO03/029038

PCT Pub. Date: Apr. 10, 2003

(65) Prior Publication Data

US 2004/0168874 A1 Sep. 2, 2004

(30) Foreign Application Priority Data

Sep. 27, 2001 (DE) .................. 101 47 852

(51) Int. Cl.
*B60K 41/26* (2006.01)
*F16D 25/10* (2006.01)
*F16D 67/04* (2006.01)

(52) U.S. Cl. .............. 192/219.4; 192/18 A; 192/87.11; 475/141

(58) Field of Classification Search .............. 192/18 A, 192/87.11, 219.4; 475/141, 143, 322
See application file for complete search history.

(56) References Cited

U.S. PATENT DOCUMENTS

| | | | | |
|---|---|---|---|---|
| 3,746,138 A | * | 7/1973 | Forster et al. | 192/87.11 |
| 4,181,042 A | | 1/1980 | Rau et al. | 74/750 R |
| 4,186,626 A | | 2/1980 | Chamberlain | 74/801 |
| 5,024,636 A | * | 6/1991 | Phebus et al. | 475/141 |
| 5,050,939 A | * | 9/1991 | Middelhoven et al. | 303/71 |
| 5,151,068 A | | 9/1992 | Mann et al. | 475/322 |
| 5,267,915 A | | 12/1993 | Estabrook | 475/269 |
| 5,779,586 A | * | 7/1998 | Gebhard et al. | 475/141 |
| 6,405,837 B1 | * | 6/2002 | Muramoto | 192/91 R |
| 6,432,016 B1 | | 8/2002 | Heilig | 475/140 |

FOREIGN PATENT DOCUMENTS

| | | |
|---|---|---|
| DE | 44 14 127 C1 | 12/1995 |
| DE | 198 20 903 A1 | 11/1999 |
| EP | 1 038 715 A2 | 3/2000 |
| GB | 1 537 997 | 1/1979 |
| WO | WO 99/58357 A1 * | 11/1999 |

* cited by examiner

*Primary Examiner*—Rodney H. Bonck
(74) *Attorney, Agent, or Firm*—Davis & Bujold, P.L.L.C.

(57) ABSTRACT

A drive device comprises a first switchgear (9) and a second switchgear (11) which can be actuated respectively hydraulic pressure in an opening direction and via spring force in a closing direction, and which are provided with a device (26) by which the first switchgear (9) and the second switchgear (11) are to be actuated in the opening direction when the switchgears are actuated in the closing direction.

16 Claims, 3 Drawing Sheets

DRIVE DEVICE

This application is a national stage completion of PCT/EP02/09710 filed Aug. 30, 2002 which claims priority from German Application Serial No. 101 47 852.6 filed Sep. 27, 2001.

FIELD OF THE INVENTION

The invention concerns a drive device.

BACKGROUND OF THE INVENTION

Drive devices having at least two switchgears actuated in closing direction by spring force and actuatable in opening direction via hydraulic pressure are often used to drive construction machines like mobile excavators. A hydrostatic engine preferably drives here the drive device in which two speed ranges can be selected by switching the first or second switchgear. Both switchgears are closed in pressureless state by spring force and are thus preferably interconnected via a planetary gear so that in this state the output is non-rotatably held and thus the switchgears are actuated in the manner of a parking brake.

DE 198 20 903 A1 discloses a drive device having two hydraulically switchable friction clutches actuatable via hydraulic pressure in opening direction and via spring force in closing direction and which in pressureless state act as parking brake. When the parking brake is actuated it is possible, by manual reduction of a store space, to build up a hydraulic pressure which can be supplied via two valves to both switchgears and thus simultaneously actuates said two switchgears in opening direction in order to make possible towing the vehicle, for example, in case of breakdown failure. In said drive device, via said valves, pressure medium from the storage space arrives at the switchgears and thus mixing pressure medium with said space can soil the switchgear. The storage space has to be entirely filled with pressure medium which presupposes a costly ventilation of the storage space. To protect the drive device from overpressure, the storage piston has a relief valve which communicates with a tank via a hose pipe. The drive device thus has to be connected via an additional hose pipe with the pressure medium tank.

The problem on which this invention is based is to provide a drive device where two switchgears, which are actuated in closing direction and thus non-rotatably keep the output in the manner of a parking brake and easily actuate it in opening direction, make possible moving the vehicle even when the prime mover is stationary and thus no pressure medium supply exists.

SUMMARY OF THE INVENTION

The inventive drive device has at least two switchgears, preferably multi-disc clutches, which can be actuated via spring force in closing direction and via hydraulic pressure in opening direction and which, when both switchgears are actuated in closing direction, can be actuated via a device in opening direction, said device having a pressurizable piston which actuates both switchgears in opening direction. The pressure actuating the piston of the device is preferably produced by a pressure medium source such as a grease gun or central lubrication installation normally existing in the tool kit of a working machine. The piston space of the device has a feedline which can be situated in any desired place of the drive device so that when said feedline is filled with the grease gun, for example, it is easily accessible on the vehicle. The pistons of the switchgears of the drive device are preferably disposed coaxially with each other, one piston forming the cylinder for the other piston. The piston of the device is preferably arranged coaxially with the piston of the switchgear, the piston of the device having two stop faces of which one stop face, when the piston of the device moves, moves along the piston of a first switchgear and one other stop face of the piston of the device moves the piston of the second switchgear via power transmission elements such as pins. The power transmission elements can be located within the piston of the first switchgear and are to be arranged so as not to discharge in any pressure space of the pistons and thus need no seals at all. The path of movement of the piston of the device and the length of the power transmission elements are preferably laid out so that when the piston of the device is pressurized thus reaching its end position, the power transmission elements are loaded exclusively with spring force of the piston of the second switchgear whereby an inadmissible deformation of the power transmission elements is eliminated. The piston space of the piston of the device is designed fully pressure-liquid tight relative to the piston spaces of the switchgears whereby is prevented, even during movements of said piston, a soiling of the switchgears. The pressure-medium supply to the piston of the device preferably has one relief valve whereby, when reaching a maximum pressure level adjusted, the pressure medium such as grease from the grease gun can escape. The pressure medium escaped via the relief valve is preferably passed to the surface of the drive device. It is thus detectable when pressure medium emerges that the switchgears are fully aerated. The force upon the piston of the device produced via the pressure medium is adjusted so that, when pressure supply exists in the vehicle and it is thus possible to switch gears, the force of the piston of the switchgear under hydraulic actuation is stronger than the force of the piston of the device, whereby, when the switchgear is hydraulically actuated, the piston of the device is pressed back to its initial position. It is thus ensured that the driving function of the drive device be guaranteed when the switchgears are operating.

By the pressure space of the piston of the device being designed pressure-medium tight and said pressure space having a separate supply line, it is eliminated that the switchgears become soiled due to actuation of the device. The supply line has a lubrication nipple which outwardly seals the pressure space of the device preferably via a recoil valve. An expensive ventilation of the piston space of the device is likewise eliminated. By the power transmission elements being located outside the pressure spaces of the switchgears, the sealing of the power transmission elements is eliminated. The seals of the piston of the device are disposed so that during normal operation of the drive device and thus not actuated device, they be only statically stressed whereby said seals do not wear out. By the piston of the device forming part of the cylinder of the first switchgear and being disposed coaxially with the piston of the first switchgear, a very compact drive device is provided. By the piston of the device acting directly upon the pistons of the switchgears, the parking brake of the drive device can be easily opened even in braced state. By the leakage of the pressure medium toward the relief valve on the surface of the drive device, it is ensured that when the device is actuated this be immediately detectable by emergence of the pressure medium. By using a single feedline to the device which can be situated in any place desired of the drive device, it is possible easily to situate in the vehicle the operation of the device. By the force upon the piston of the switchgear when the switchgear is actuated being stronger than the force upon the piston of the device when the device is actuated, it is ensured that when a gear is hydraulically engaged the device be pressed back to its initial position.

BRIEF DESCRIPTION OF THE DRAWINGS

The invention will now be described, by way of example, with reference to the accompanying drawings in which.

DETAILED DESCRIPTION OF THE INVENTION

Figure 1:
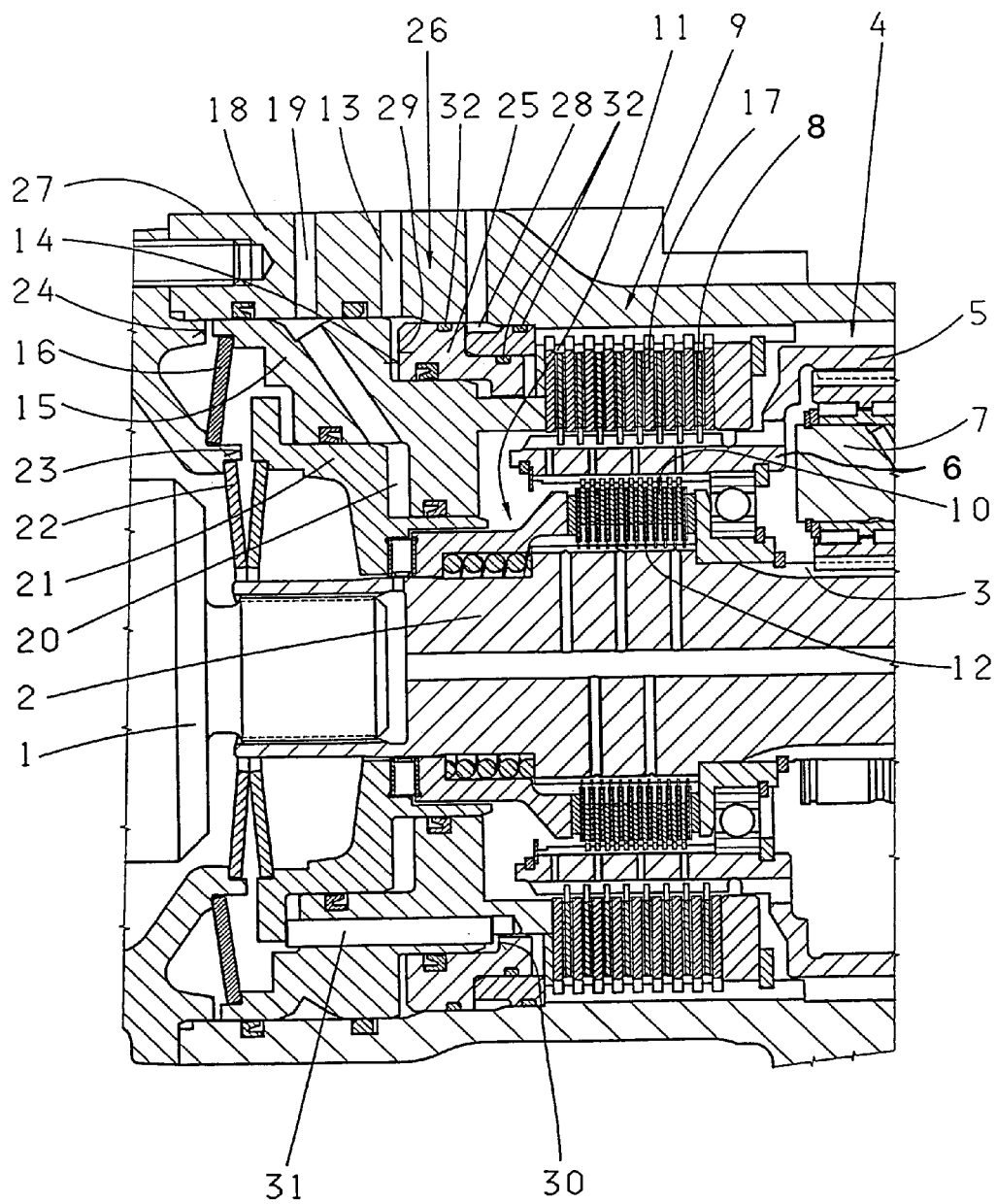
FIG. 1 a section of the drive device with the two switchgears and the device, the same as axially disposed power transmission elements.
Figure 2:
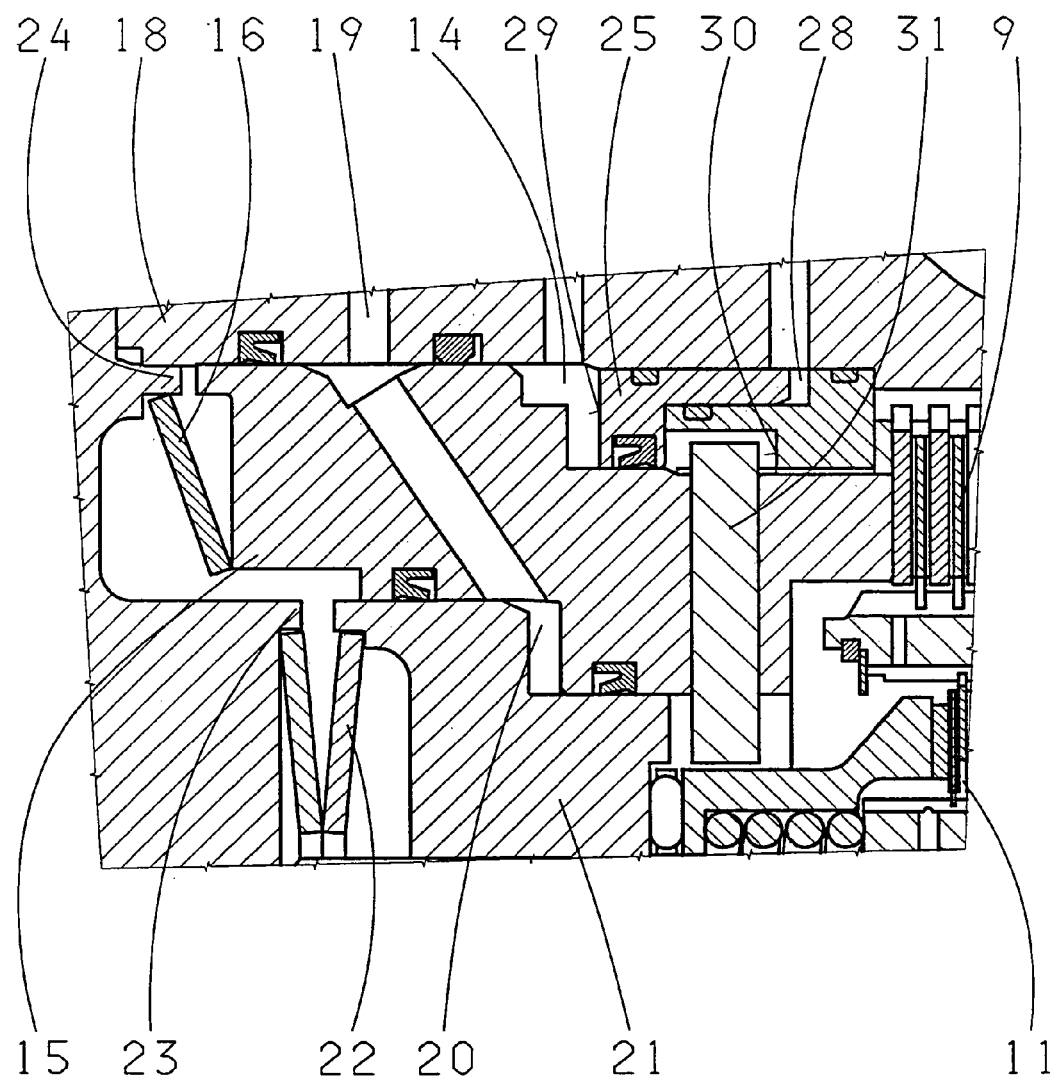
FIG. 2 a section of the drive device with both switchgears, the same as radially disposed power transmission elements.
Figure 3:
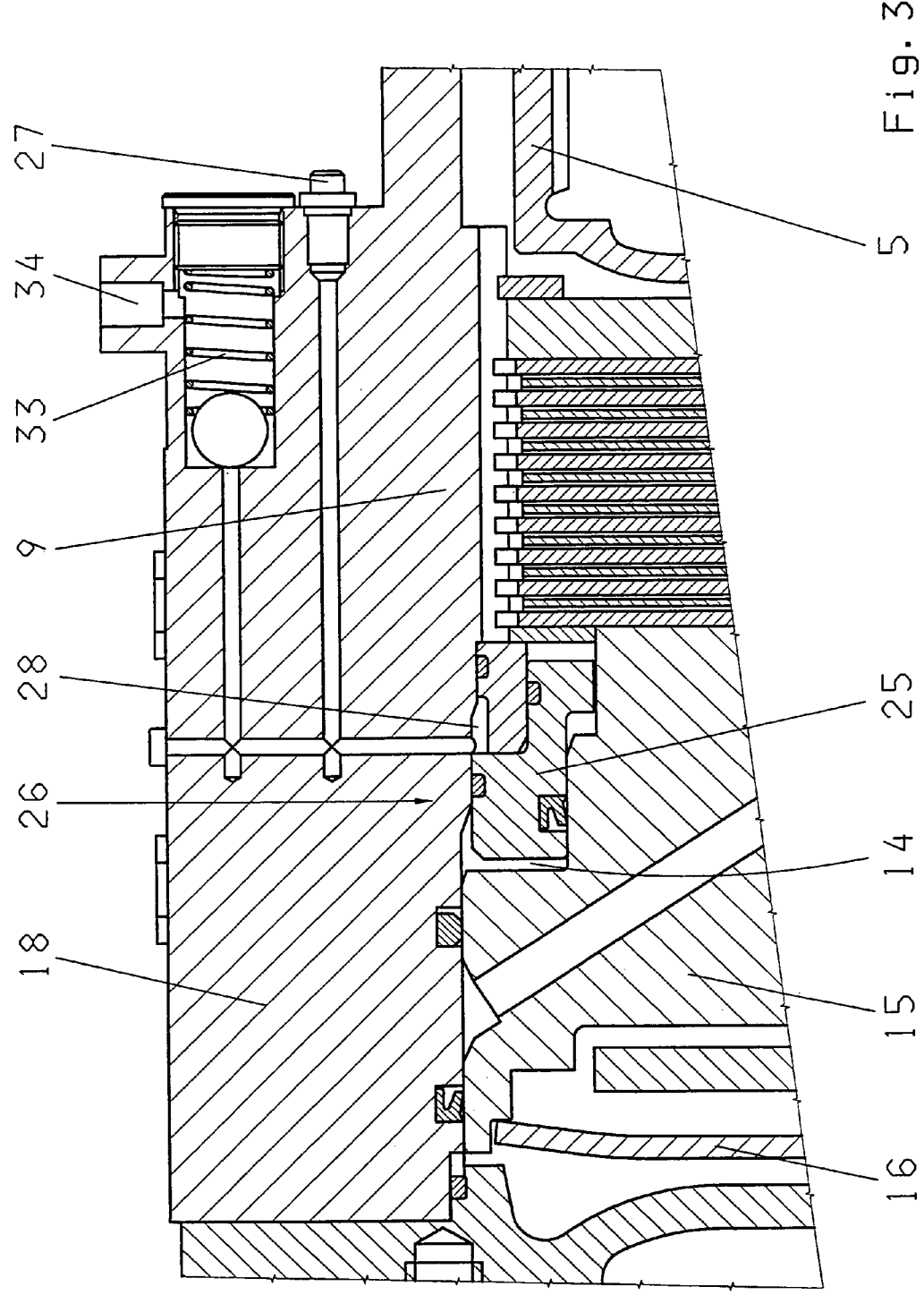
FIG. 3 a section of the drive device according to FIG. 1 and a pressure-limiting valve.

FIG. 1:

A prime mover 1 drives an input shaft 2 with an inner central wheel 3 of a planetary gear 4. An outer central wheel 5 is connected with a disc carrier 6. A planet carrier 7 forms the output of the planetary gear 4 and is connected with the output (not shown) of the drive device. Inner discs 8 of a first switchgear 9 are connected with the disc carrier 6. Outer discs 10 of a second switchgear 11 are connected with the disc carrier 6. Inner discs 12 of the second switchgear 11 are connected with the input shaft 2. To engage a first speed range, the first switchgear 9 is actuated in closing direction while a line 13 and thus a space 14 are pressurelessly engaged and thus a piston 15 is moved by the force of a spring 16 and the inner discs 8 are connected with outer discs 17 and thus the outer toothed wheel 5 with a housing 18 and a line 19 and a space 20 are loaded with hydraulic pressure, a piston 21 thus being moved against the force of a spring 22 up to its stop 23. A second speed range is engaged by the line 13 being loaded with pressure and the line 19 being pressurelessly engaged. The piston 15 thus moves against the force of the spring 16 up to its stop 24 and the piston 21 is moved by the force of the spring 22 so that the inner discs 12 are non-rotatably connected with the outer discs 10 and thus the ring gear 4 with the inner central wheel. The piston 21 is disposed coaxially with the piston 15 and the piston 25 of a device 26. The piston 15 forms cylinders for the piston 21 and the piston 25 forms one part of the cylinder for the piston 15. By the space 20 being pressurized in the first seed range and thus the force of the spring 16 and the force from the pressurization of the space 20 acting upon the piston 15, the force of the spring 16 can be laid out weaker. In pressureless state of the spaces 14 and 20 the pistons 15 and 21 are moved via the forces of the springs 16 and 22 so that the first switchgear 9 and the second switchgear 11 are actuated in closing direction. If the first switchgear 9 and the second switchgear 11 are actuated in closing direction, the planet carrier 7 of the planetary gear 4 is non-rotatably connected with the housing 18. The function of a parking brake is thus performed in this state. If it is no longer possible to release the parking brake by pressurization of the space 14 or 20 due to a breakdown failure in the vehicle, pressure medium is conveyed into a space 28 via a connection 27 which can be located in any desired place of the drive device. This can occur, for example, via a grease gun existing in the tool kit. By the pressurization of the space 28, the piston 25 moves from its initial position far enough for its first stop 29 to abut on the piston 15 and thus move it and its second stop 30 to abut via power transmission elements 31 on the piston 21 which it moves. If the piston 25 reaches its end position, the first switchgear 9 and the second switchgear 11 are moved entirely in opening direction whereby the vehicle can be towed. The length of the power transmission elements is laid out so that the end position of the piston 25 be determined by the fact that the face 29 abuts on the piston 15 and the piston 15 abuts on the stop 24, the piston 21 still not having reached the stop 23. It is thus ensured that the power transmission elements 31 be loaded exclusively with force of the spring 22. The power transmission elements 31 are located radially outside the space 21 and radially within the space 28 and the space 14. Thus it is not necessary to provide the power transmission elements 31 with sealing agent. Sealing agents 32, which seal the space 28, are not loaded with pressure in the normal operating state and are exclusively statically stressed, since for engaging the first switchgear 9 or for engaging the second switchgear 11 the piston 25 is not moved. If while the device 26 is actuated the vehicle is again ready for operation and the second speed range is engaged, then the piston 25 is again returned to its initial position by the pressure in the piston space 14. The piston space 28 here becomes pressureless preferably by the unscrewing of a pressure-limiting valve 33. The pistons 15 and 21, the same as the piston 25, are arranged so as to perform exclusively linear movements and no rotation movement. This becomes significant only on the wear of the sealing elements.

FIG. 2:

A first speed range is engaged by pressurizing the space 20. The piston 15 thus moves by the force of the spring 16 and the pressure in the space 20 whereby the first switchgear 9 is actuated in closing direction. With the first switchgear 9 and the second switchgear 11 a planetary gear 4 is connected, as shown in FIG. 1. A second speed range is engaged by the space 20 being pressureless and the space 14 pressurized. The piston 21 thus moves by the force of the spring 22 and actuates the second switchgear 11 in closing direction and the piston 15 moves against the force of the spring 16 and actuates the first switchgear 9 in opening direction. If the first switchgear 9 and the second switchgear 11 are actuated in closing direction and the spaces 20 and 14 are thus pressurelessly engaged, it is possible to move by pressurization of the space 28 the piston 25 which via its first stop 29 moves the piston 15 and via the radially disposed power transmission element 31, which is located in the piston 15, moves the piston 21 and thus the switchgears 9 and 11 are actuated in opening direction. The pistons 15 and 21 are thus moved via positive engagement. The aeration of the pistons 15 and 21 is thus possible even in case of breakdown failure of the switchgears 9 and 11. The end position of the piston 25 is determined via the stop 29 and the stop 24, the same as via the piston 15. Said end position is laid out so as to be first reached before the power transmission element 31 moves the piston 21 up to its stop 23. It is thus ensured that only the force of the spring 22 acts upon the power transmission element 31.

FIG. 3:

Pressure medium, for example, grease from a grease gun or oil from a pressure medium source, is conveyed via the connection 27 to the space 28. In order not to let any inadmissibly high pressure to generate in the space 28, with the space 28 is connected a pressure-limiting valve 33 by which, above a defined pressure level, pressure medium can escape via an opening 34 into a housing 18. It is thus ensured that it be possible from outside to see the complete opening of the first switchgear 9 and of the second switchgear 11 by emergence of pressure medium from the opening 34.

Reference Numerals
1 prime mover
2 input shaft
3 inner central wheel
4 planetary gear
5 outer central wheel
6 disc carrier
7 planet carrier
8 inner discs
9 first switchgear
10 outer discs
11 second switchgear
12 inner discs
13 line
14 space
15 piston
16 spring
17 outer discs
18 housing
19 line
20 space
21 piston
22 spring
23 stop
24 stop
25 piston
26 device
27 connection
28 space
29 first face
30 second face
31 power transmission elements
32 sealing agent
33 pressure-limiting valve
34 opening

The invention claimed is:

1. A drive device comprising:
at least one first switchgear (9) and one second switchgear (11) in which each switchgear is actuatable by a spring force in an engaged direction and by hydraulic pressure in a disengaged direction;
wherein during simultaneous actuation of said first switchgear (9) and second switchgear (11) in the engaged direction, an output (7) of the drive device is prevented from rotating so as to form a parking brake, and a disengaging device (26) simultaneously disengaging said first switchgear (9) and said second switchgear (11),
for simultaneously disengaging said first switchgear (9) and said second switchgear (11), said disengaging device (26) has a disengaging device piston (25) which is separately pressurizable from the first and second switchgears (9, 11) and which, in a pressurized state, actuates both the first and second switchgear (9, 11) in the disengaging direction against the spring force acting on the first and second switchgears (9, 11); and
the first switchgear (9) has a first switchgear piston (15) where power transmission elements (31) are situated by which movements of the disengaging device piston (25) of the disengaging device (26) can be transmitted to a second switchgear piston (21) of the second switchgear (11).

2. A drive device comprising:
at least one first switchgear (9) and one second switchgear (11) in which each switchgear is actuatable by a spring force in an engaged direction and by hydraulic pressure in a disengaged direction;
wherein during simultaneous actuation of said first switchgear (9) and second switchgear (11) in the engaged direction, an output (7) of the drive device is prevented from rotating so as to form a parking brake, and a disengaging device (26) simultaneously disengaging said first switchgear (9) and said second switchgear (11),
for simultaneously disengaging said first switchgear (9) and said second switchgear (11), said disengaging device (26) has a disengaging device piston (25) which is separately pressurizable from the first and second switchgears (9, 11) and which, in a pressurized state, actuates both the first and second switchgear (9, 11) in the disengaging direction against the spring force acting on the first and second switchgears (9, 11); and
the first switchgear piston (15) is situated in said first switchgear (9) which is disposed coaxially with the second switchgear piston (21) of the second switchgear (11) and coaxially with the disengaging piston (25) of the disengaging device (26).

3. The drive device according to claim 2, wherein pressure for actuation of said disengaging device (26) is produced by a pressure medium source.

4. The drive device according to claim 2, wherein said disengaging device (26) has a means for limiting a pressure (33) by which said disengaging device piston (25) can be loaded, and excessive pressure medium is passed to a surface (34) of said drive device.

5. The drive device according to claim 2, wherein the first piston (15) of the first switchgear (9) forms a cylinder for the second piston (21) of the second switchgear (11), and the disengaging piston (25) of the disengaging device (26) forms one part of a cylinder of the first switchgear (9).

6. The drive device according to claim 2, wherein the movement of the disengaging device piston (25) that can be transmitted to the second switchgear piston (21) of said second switchgear (11) is limited so that a spring force acting on the power transmission elements (31) is solely from a second switchgear spring (22) acting on the second switchgear (11).

7. The drive device according to claim 2, wherein the first and second switchgear pistons (15, 21) are moved to the disengaged positions by positive engagement of the disengaging piston (25) during actuation of the disengaging device (26).

8. The drive device according to claim 2, wherein the separate pressurization of the disengaging device (26) facilitates disengagement of the first and second switchgears (9, 11) even in a case of a defective sealing of at least one of the first and second switchgears (9, 11).

9. A drive device comprising:
a first switchgear (9) being biased toward an engaged position by a first spring (16) acting on a first piston (15) and being biased toward a disengaged position, against a force of the first spring (16), by pressurization of the first piston (15);
a second switchgear (11) being biased into an engaged position by a second spring (22) acting on a second piston (21) and being biased toward a disengaged position, against a force of the second spring (22), by pressurization of the second piston (21);

so that the first and second switchgears (9, 11) are biased to the engaged positions, by the respective first and second springs (16, 22), and the first and second switchgears (9, 11) thereby form a parking brake and maintain an output (7) of the drive device in a non-rotatable state; and a third piston (25), pressurizable separately from the first and second pistons (15, 21), actuates both of the first and second pistons (15, 21) and disengage the first and second switchgears (9, 11);

wherein the disengaging piston (25) is coaxial with and forms a least a part of a cylinder for the first switchgear piston (15); and the first switchgear piston (15) is coaxial with and forms a cylinder for the second switchgear piston (21).

10. The drive device according to claim 9, further comprising:

a disc carrier (6) is coaxial with and located between the first and second switchgears (9, 11) and engages with radially inwardly extending discs (8) of the first switchgear (9) and with radially outwardly extending discs (10) of the second switchgear (11).

11. The drive device according to claim 9, wherein the first switchgear (9) has a first switchgear piston (15) where power transmission elements (31) are situated by which movements of the disengaging device piston (25) of the disengaging device (26) can be transmitted to a second switchgear piston (21) of the second switchgear (11).

12. The drive device according to claim 9, wherein pressure for actuation of said disengaging device (26) is produced by a pressure medium source.

13. The drive device according to claim 9, wherein said disengaging device (26) limits pressure (33) by which said disengaging device piston (25) can be loaded, and excessive pressure medium is passed to a surface (34) of said drive device.

14. The drive device according to claim 9, wherein the first piston (15) is situated in the first switchgear (9) which is disposed coaxially with the second piston (21) of the second switchgear (11) and coaxially with the disengaging piston (25) of the disengaging device (26).

15. The drive device according to claim 9, wherein the first and second switchgear pistons (15, 21) are moved to the disengaged positions by positive engagement of the disengaging piston (25) during actuation of the disengaging device (26).

16. The drive device according to claim 9, wherein the separate pressurization of the disengaging device (26) facilitates disengagement of the first and second switchgears (9, 11) even in a case of a defective sealing of at least one of the first and second switchgears (9, 11).

* * * * *